United States Patent
James

(10) Patent No.: US 9,603,486 B2
(45) Date of Patent: Mar. 28, 2017

(54) BARBECUE COOKING ASSEMBLY

(76) Inventor: Dale Peter James, Ningbo (CN)

(*) Notice: Subject to any disclaimer, the term of this patent is extended or adjusted under 35 U.S.C. 154(b) by 514 days.

(21) Appl. No.: 14/241,985

(22) PCT Filed: Aug. 30, 2012

(86) PCT No.: PCT/CN2012/080757
§ 371 (c)(1),
(2), (4) Date: Apr. 23, 2014

(87) PCT Pub. No.: WO2013/029549
PCT Pub. Date: Mar. 7, 2013

(65) Prior Publication Data
US 2014/0299002 A1 Oct. 9, 2014

(30) Foreign Application Priority Data
Aug. 30, 2011 (AU) ................ 2011903482

(51) Int. Cl.
A47J 37/04 (2006.01)
A47J 37/07 (2006.01)

(52) U.S. Cl.
CPC ........... A47J 37/043 (2013.01); A47J 37/041 (2013.01)

(58) Field of Classification Search
CPC ............. A47J 37/04; A47J 37/06; A47J 37/07
USPC ............. 99/421 H, 421 HH, 421 HV, 421 R, 99/421 M, 421 P, 421 TP, 419
See application file for complete search history.

(56) References Cited

U.S. PATENT DOCUMENTS 3,379,119 A * 4/1968 Harrill ................. A47J 37/042
99/421 P
3,473,464 A * 10/1969 Lasker ................. A47J 37/049
99/421 R
3,901,136 A * 8/1975 Wilson ................. A47J 37/042
99/341
3,935,806 A 2/1976 Connolly
4,688,477 A * 8/1987 Waltman ............... A47J 37/049
99/427
5,048,401 A 9/1991 Hoover
5,172,628 A 12/1992 Pillsbury et al.
5,562,022 A * 10/1996 Schmid ................. A47J 37/042
126/25 R (Continued)

FOREIGN PATENT DOCUMENTS

CN 1933756 A 3/2007
KR 1003873910000 B 6/2003

OTHER PUBLICATIONS

International Search Report mailed on Nov. 22, 2012, for PCT Application No. PCT/CN2012/080757 (7 pages).

Primary Examiner — Michael Laflame, Jr.
(74) Attorney, Agent, or Firm — Kilpatrick Townsend & Stockton LLP

(57) ABSTRACT

A barbecue cooking assembly includes a rotating disk capable of rotating around a shaft and a skewer for impaling food. Several skewer brackets are disposed on the rotating disk. The edge of a disk surface of the rotating disk is provided with a first notch corresponding to each skewer bracket. The end of the skewer bracket is fixedly connected to the disk surface, and the other end extends in a direction far away from the center of the rotating disk to form a limit piece parallel to the disk surface. The limit piece is provided with a second notch corresponding to the first notch and disposed coaxially with the first notch.

20 Claims, 6 Drawing Sheets

(56) References Cited

U.S. PATENT DOCUMENTS

| | | | | |
|---|---|---|---|---|
| 5,970,854 A | * | 10/1999 | Tsai | A47J 37/042 99/419 |
| 6,138,553 A | * | 10/2000 | Toebben | A47J 37/042 126/25 AA |
| 6,347,577 B1 | * | 2/2002 | Harneit | A47J 37/047 99/419 |
| 7,021,203 B2 | * | 4/2006 | Backus | A47J 37/041 99/421 H |
| 2013/0074704 A1 | * | 3/2013 | Huang | A47J 37/041 99/421 H |
| 2015/0144009 A1 | * | 5/2015 | Schlanger | B60B 1/003 99/421 R |

\* cited by examiner

BARBECUE COOKING ASSEMBLY

CROSS-REFERENCE TO RELATED APPLICATIONS

This application is a U.S. National Phase of International Application No. PCT/CN2012/080757, filed Aug. 30, 2012, which claims priority to Australian Patent Application No. 2011903482, filed Aug. 30, 2011, the disclosures of which are incorporated by reference herein.

FIELD OF TECHNOLOGY

The present patent application relates to a barbecue cooking equipment and more specifically to a rotating disk, skewer can be fixed on the rotating disk and a clip to demount the skewer for barbecue cooking meat or other food.

BACKGROUND

Barbecue is a kind of cooking method which fixes food on a food holder or a grill and heat the food under the food holder or grill. This cooking method is loved by the people all over the world from ancient till now.

Chinese patent application no. CN 1933756A disclosed a rotary barbecue apparatus, which comprises a furnace capable of receiving heat source therein; a rotational shaft installed freely rotatably and vertically at center of the furnace in such a manner that at least a portion of the rotational shaft protrudes beyond the furnace; a driving means for rotating the rotational shaft; a plurality of meat skewer bars for skewering and holding meat; a first rotation means mounted at a point of the rotational shaft protruding beyond the furnace, for rotating each of the plurality of meat skewer bars as it is and simultaneously rotating the same around the rotational shaft; and a second rotation means located beyond the first rotation means and operating in the same way as the first rotation means.

The rotary barbecue apparatus disclosed above has below defects:

1. The mounting of the meat skewer bars on the rotation means is not stable. When the rotary barbecue apparatus rotating, the meat skewer bars is easily to fall off from the mounting location;

2. During the operation of the rotary barbecue apparatus, the meat skewer bars cannot be separated and demounted alone. When mounting or demounting the meat skewer bars, the rotation means must stop operating.

SUMMARY

The present patent application provides a barbecue cooking assembly. The barbecue cooking assembly is mounted to the grill and solves the above mentioned technical problems and defects. The present patent application makes the mounting of the skewer to the grill more stable. The skewer can be mounted and demounted from the grill alone. In addition, while mounting or demounting the skewer, the rotation device can keep running.

The barbecue cooking assembly of the present patent application includes a rotating disk rotating around a shaft and a skewer used to skewer the food. The rotating disk is provided with a plurality of skewer bracket, the edge of the rotating disk is provided with a first notch corresponding to each skewer bracket. One end of the skewer bracket is fixedly connected with the rotating disk and the other end of the skewer bracket extends in a direction far away from the rotating disk to form a limit piece which is parallel to the rotating disk. The limit piece is provided with a second notch which corresponding to the first notch. The skewer includes a skewer body and an elastic locking part disposed at one end of the skewer body. The elastic locking part is embedded between the first notch and the second notch.

The elastic locking part includes a first sleeve, an elastic part and a second sleeve sequentially arranged on the skewer body. The two ends of the elastic part connect to the first sleeve and the second sleeve. The first sleeve is provided with a first stepped surface embedded in the first notch and a stepped surface stopper which assist the first stepped surface to be embedded in the first notch. The second sleeve is provided with a second stepped surface embedded in the second notch and a stepped surface stopper which assist the second stepped surface to be embedded in the second notch. When the first sleeve is embedded in the first notch and the second sleeve is embedded in the second notch, the elastic part is in a compressed status. The first stepped surface and the second stepped surface are preferably circular stepped surfaces.

In the above technical solution, the first sleeve includes a first stepped surface and a first stepped surface stopper and the second sleeve comprises a second stepped surface and a second stepped surface stopper. When the first stepped surface of the first sleeve is embedded in the first notch and the second stepped surface of the second sleeve is embedded in the second notch, the elastic part is in the compressed status. This configuration makes the elastic locking part to be embedded between the first notch and the second notch more closely and firmly and will not off.

In one embodiment of the present patent application, the first notch and the second notch have a same shape and size. The first sleeve and the second sleeve have a same shape and size and are setup in an opposite direction. The first notch includes an opening and an arc recess from the opening to the center of the rotating disk. The width of the opening is smaller than or equal to the diameter of the arc recess.

In order to make the first sleeve is clamped in the first notch more firmly and the second sleeve is clamped in the second notch more firmly, the width of the opening is smaller than the diameter of the arc recess. The skewer body is provided on the surface with a first limiting protrusion which restrict the first sleeve sliding away from the second sleeve and a second limiting protrusion which restrict the second sleeve sliding away from the first sleeve.

In the above technical solution, the elastic part is preferably a spring.

In another embodiment of the present patent application, the barbecue cooking assembly further includes a locking sleeve which is fixed to the center of the rotating disk and a rotating shaft passing through the locking sleeve. The locking sleeve is a cylinder having a cavity and is coaxial with the center of the rotating disk. A side of the cylinder is inserted with a braking screw. The rotating shaft is connected with the locking sleeve by the braking screw. When the rotating disk is fixedly mounted on the rotating shaft, the rotating shaft can be electrically connected to a motor which drive the rotating shaft to rotate. The rotating of the rotating disk can ensure uniform heating of food in the cooking process.

In another embodiment of the present patent application, the barbecue cooking assembly further includes a clip to hold the skewer. The clip is provided with teeth for engaging with the first sleeve and the second sleeve respectively. The first sleeve and the second sleeve have stepped surface to be engaged with the teeth. The first sleeve is provided with a third stepped surface and a third stepped surface stopper. The second sleeve is provided with a fourth stepped surface and a fourth stepped surface stopper. The third stepped surface and the fourth third stepped surface constitute the stepped surfaces to be engaged with the teeth.

In the above technical solution, the contour of the teeth is preferably U-shaped.

In yet another embodiment of the present patent application, the first sleeve or the second sleeve includes a hollow cone frustum, a small cylinder, a middle cylinder and a big cylinder which are stacked successively. The radius of the bottom surface of the cone frustum is equal to the radius of the bottom surface of the small cylinder. The radius of the bottom surfaces of the small cylinder, the middle cylinder and the big cylinder increase successively. The side of the small cylinder forms the first stepped surface or the second stepped surface. The circular end faces where the middle cylinder and the small cylinder connect form the first stepped surface stopper and the second stepped surface stopper. The side of the middle cylinder forms the third stepped surface or the forth stepped surface. The circular end faces where the big cylinder and the middle cylinder connect form the third stepped surface stopper and the forth stepped surface stopper.

The cone frustum in front of the small cylinder brings the below advantage: when clamping the skewer into the first notch, the cone frustum can guide the direction. In other words, the elastic locking part can be guided into the clamping position more smoothly and more quickly.

Referring to the above description, the advantages of the present patent application includes:

(1) The rotating disk is provided with a plurality of skewer bracket, the edge of the rotating disk is provided with a first notch corresponding to each skewer bracket. One end of the skewer bracket is fixedly connected with the rotating disk and the other end of the skewer bracket extends in a direction far away from the rotating disk to form the limit piece which is parallel to the rotating disk. The limit piece is provided with a second notch which corresponding axially to the first notch. The skewer includes a skewer body and an elastic locking part disposed at one end of the skewer body. The elastic locking part is embedded between the first notch and the second notch. The skewer of the present patent application connects with the first notch and the second notch by the elastic locking part. This configuration makes the mounting of the skewer to the rotating disk more firmly.

(2) The barbecue cooking assembly of the present patent application further includes a clip to hold the skewer. The clip is provided with teeth for engaging with the first sleeve and the second sleeve respectively. The contour of the teeth is preferably U-shaped. The first sleeve and the second sleeve have stepped surface to be engaged with the teeth. In the rotating process of the rotating disk, the skewer can be alone demounted from the barbecue cooking assembly. When removing barbecued skewer, the teeth of the clip engage with the third stepped surface of the first sleeve and the fourth stepped surface of the second sleeve. Thus the clip can engage with the first sleeve and the second sleeve of the skewer and the skewer can be demounted from the rotating disk.

(3) The first sleeve and the second sleeve have a pretty ingenious structure: the first sleeve or the second sleeve includes a hollow cone frustum, a small cylinder, a middle cylinder and a big cylinder stacked successively. The radius of the bottom surface radius of the cone is equal to the bottom surface radius of the small cylinder. The radius of the bottom surfaces of the small cylinder, the middle cylinder and the big cylinder increase successively. The side of the small cylinder forms the first stepped surface or the second stepped surface. The circular end faces where the middle cylinder and the small cylinder connect form the first stepped surface stopper and the second stepped surface stopper. The side of the middle cylinder forms the third stepped surface or the forth stepped surface. The circular end faces where the big cylinder and the middle cylinder connect form the third stepped surface stopper and the forth stepped surface stopper.

When need to install the skewer into the rotating disk, the first sleeve needs to be embedded into the first notch. At this stage, the cone frustum has a function of guiding the first sleeve through the first notch. When the skewer is mounted on the rotating disk, the bottom surface radiuses of the three cylinders of the first sleeve increase successively in the direction from the first notch to the second notch and form stepped surface with three steps. Accordingly, the bottom surface radiuses of the three cylinders of the second sleeve decrease successively in the direction from the first notch to the second notch and form stepped surface with three steps. The configuration of the stepped surface has below advantages. The circular end faces where the middle cylinder and the small cylinder connect form the first stepped surface stopper and the second stepped surface stopper. The circular end faces where the big cylinder and the middle cylinder connect form the third stepped surface stopper and the forth stepped surface stopper. The first stepped surface of the small cylinder cooperates with the first stepped surface stopper and the second stepped surface cooperates with the second stepped surface stopper. This makes the first sleeve to be embedded into the first notch and the second sleeve to be embedded into the second notch. Furthermore, the force released by the compressed spring make the elastic locking part to be embedded into the first notch and the second notch more closely and firmly.

in drawings: 1—rotating disk; 2—skewer, 3—skewer bracket, 4—first notch, 5—limit piece, 6—second notch, 7—elastic locking part, 71—first sleeve, 72—elastic part, 73—second sleeve, 81—first step surface, 82—second step surface, 83—third step surface, 84—fourth step surface, 91—first limiting protrusion, 92—second limiting protrusion, 10—locking sleeve, 11—braking screw, 12—clip, 13—teeth, 15—cone frustum, 16—small cylinder, 17—middle cylinder, 18—big cylinders, 19—circular end face where middle cylinder and small cylinder connect, 20—circular end face where big cylinder and middle cylinder connect.

DETAILED DESCRIPTION

The principles of the barbecue cooking assembly of the present patent application will be described in detail to a preferred embodiment with reference to the drawings. Exemplary embodiments disclosed are described for better understand of the present patent application for those skilled in the relevant art rather than limit the present patent application.

Embodiment 1

Figure 1:
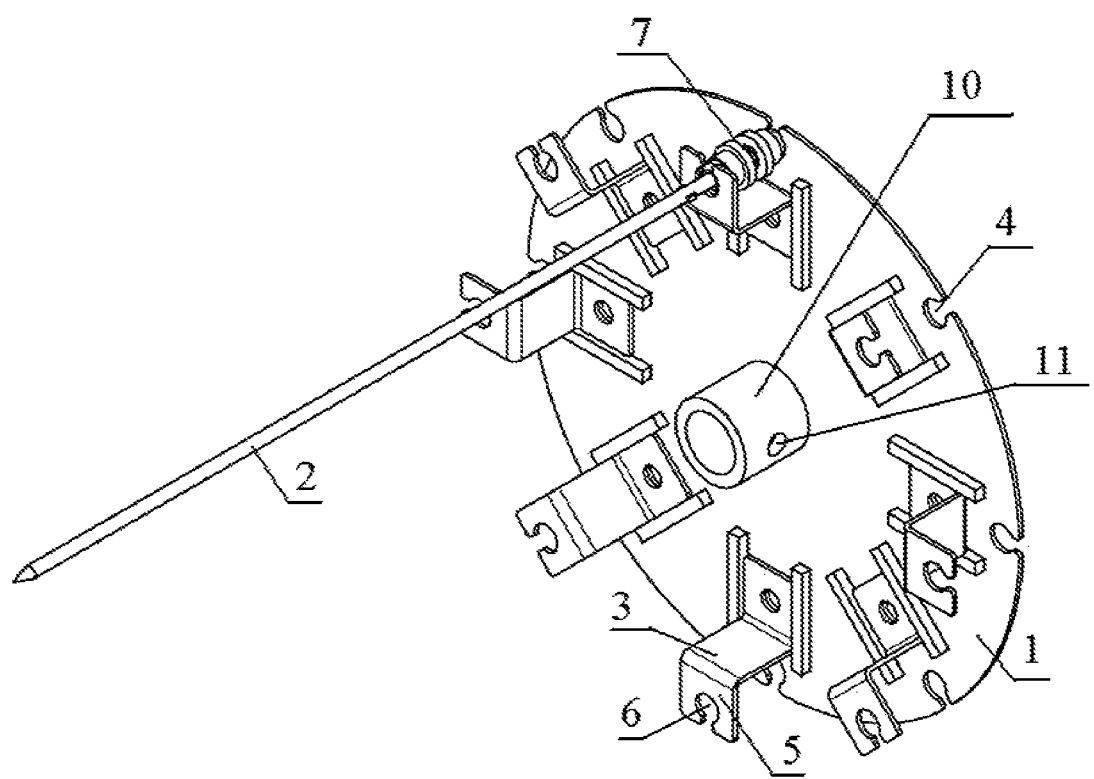
FIG. 1 illustrates the skewer fixed on the rotating disk according to Embodiment 1 of the present patent application.
Figure 2:
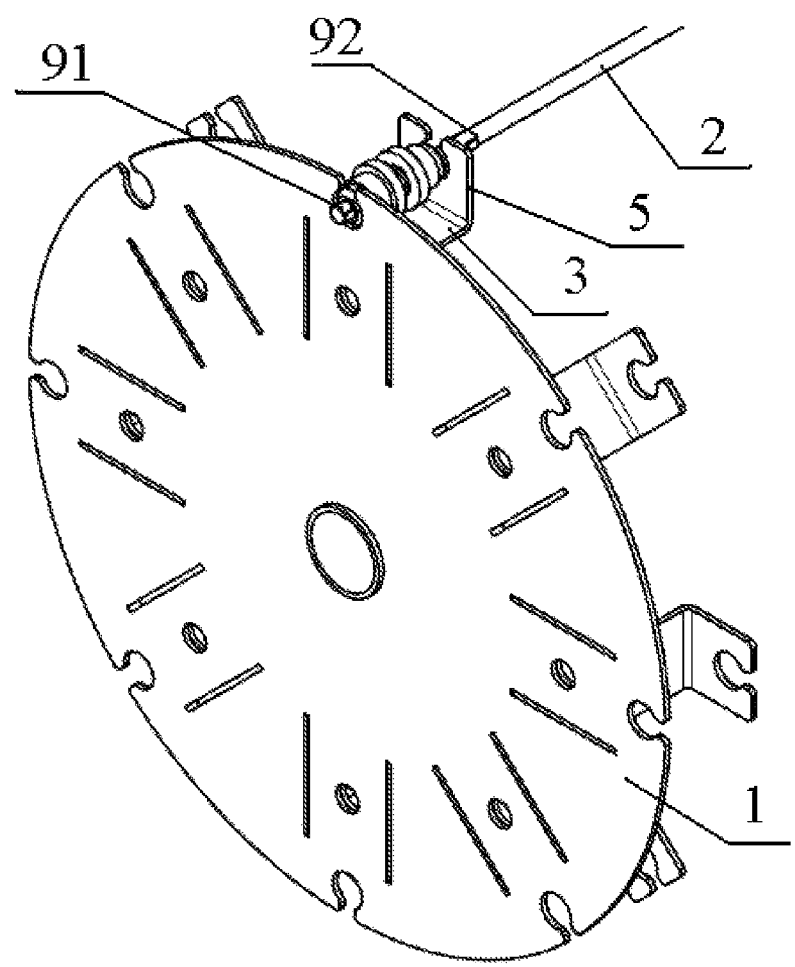
FIG. 2 illustrates the configuration in FIG. 1 viewed from another side of the rotating disk.
Figure 3:
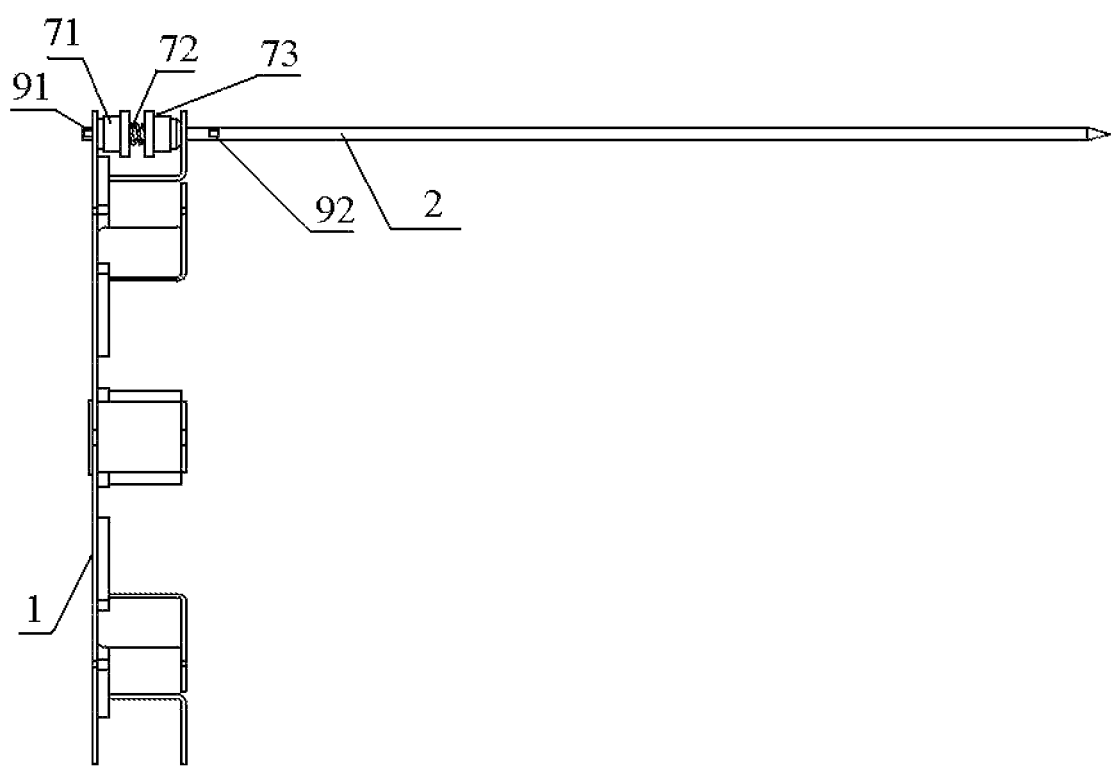
FIG. 3 is a front view of the configuration in FIG. 2.

FIGS. 1-3 are the structural diagrams of the skewer fixed on the rotating disk according to embodiment 1. As shown in FIG. 1, the barbecue cooking assembly of the present patent application includes a rotating disk 1 rotating around a shaft and a skewer 2 for skewering food. Eight skewer brackets 3 are disposed on the rotating disk. The edge of the rotating disk 1 is provided with eight first notches 4 which are corresponding to each skewer bracket 3. One end of the skewer bracket 3 is fixedly connected to the rotating disk 1 surface and the other end of the skewer bracket 3 extends in a direction far away from the rotating disk 1 to form a limit piece 5 which is parallel to the rotating disk 1 surface. The limit piece 5 is provided with a second notch 6 which corresponding to the first notch 4. The skewer 2 includes a skewer body and an elastic locking part 7 disposed at an end of the skewer body. The elastic locking part 7 is embedded between the first notch 4 and the second notch 6.

As shown in FIGS. 1 and 2, the skewer bracket 3 can be a metal piece which includes three parts connected successively, one part of the metal piece is fixed on the surface of rotating disk 1 by screw, the middle part is vertical to the surface of rotating disk 1, and the other part of the metal piece is parallel to the surface of rotating disk 1.

The elastic locking part 7 includes a first sleeve 71, a spring 72 and a second sleeve 73 successively arranged on the skewer body. The two ends of the spring 72 connect to the first sleeve 71 and the second sleeve 73. The skewer body is provided on the surface with a first limiting protrusion 91 and a second limiting protrusion 92 which restrict the elastic locking part 7 from sliding away. When the skewer is at a separation status which means it is not mounted on the rotating disk, the sliding of the elastic locking part 7 is limited between the two limiting protrusions and will not off from the skewer body. The first limiting protrusion 91 can restrict the first sleeve 71 sliding away from the second sleeve 73; the second limiting protrusion 92 can restrict the second sleeve 73 sliding away from the first sleeve 71.

When the elastic locking part 7 is mounted on the rotating disk which means that the first sleeve 71 and the second sleeve 73 are embedded between the first notch 4 and the second notch 6, the sum of the projection distance of the first sleeve 71, spring 72 and second sleeve 73 to the skewer 2 is marked as L. The distance between the first limiting protrusion 91 and the second limiting protrusion 92 is bigger than L.

In the present embodiment, the first notch 4 and the second notch 6 have the same shape and size. Accordingly, the first sleeve 71 and the second sleeve 73 have the same shape and size and are set symmetrically at two ends of the spring 72.

The first sleeve 71 is provided with a first stepped surface 81 embedded in the first notch 4 and a first stepped surface stopper 19 which assist the first stepped surface 81 to be embedded in the first notch 4. The second sleeve 73 is provided with a second stepped surface 82 embedded in the second notch 6 and a second stepped surface stopper 19 which assist the second stepped surface 82 to be embedded in the second notch 6. When the first sleeve 71 is embedded in the first notch 4 and the second sleeve 73 is embedded in the second notch 6, the spring 72 is in a compressed status.

To make the skewer 2 to be embedded between the first notch 4 and the second notch 6 more stably, the first notch 4 adopts an open circular structure which includes an opening and an arc recess from the opening to the center of the rotating disk. The width of the opening is smaller than the diameter of the arc recess.

To facilitate the rotating of the rotating disk 1, the barbecue cooking assembly includes a locking sleeve 10 which is fixed to the center of the rotating disk 1 and a rotating shaft passing through the locking sleeve 10. The locking sleeve 10 is a cylinder having a cavity and is coaxial with the center of the rotating disk 1. The side of the cylinder is inserted with a braking screw 11. The rotating shaft is connected with the locking sleeve 10 by the braking screw 11. During the operation, the rotating shaft can be electrically connected to a motor which drive the rotating disk 1 to rotate. The rotating shaft can be used to skewering meat or other food to be barbecued. After the meat or other food is skewered on the rotating shaft, the rotating shaft is then fixed into the locking sleeve 10 by braking screw 11. Due to the fixed connection by braking screw 11, the rotating shaft can skewering large amount of meet or other food.

Figure 6:
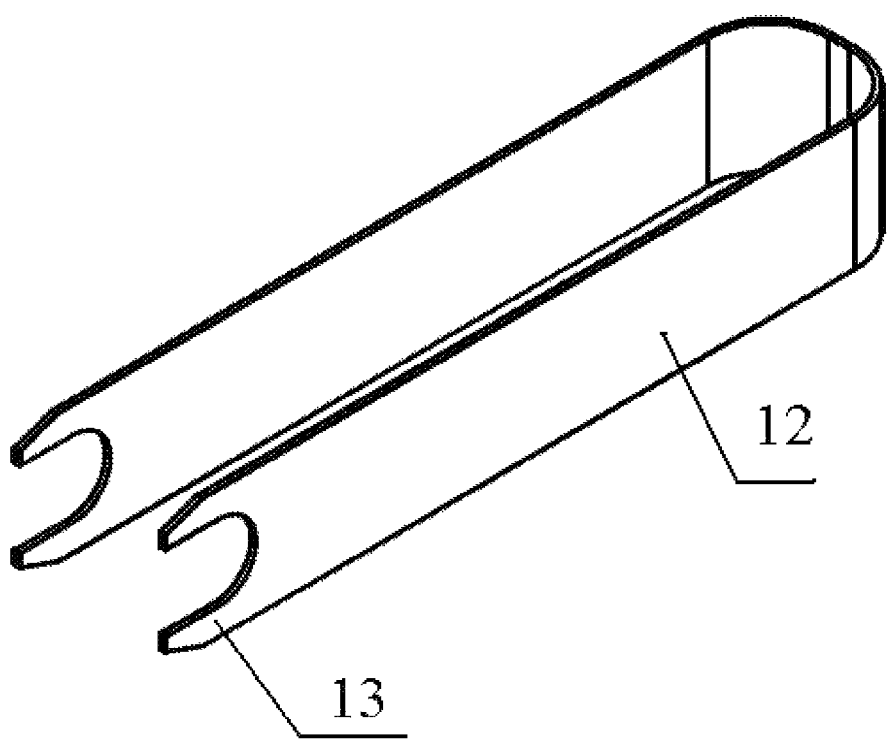
FIG. 6 is a structural diagram of the clip in the Embodiment 1 of the present patent application.

As shown in FIG. 6, to demount the skewer 2 from the first notch 4 and the second notch 6 more conveniently, the barbecue cooking assembly includes a clip 12 to hold the skewer 2. The clip is provided with tooth 13 for engaging with the first sleeve 71 and the second sleeve 73 respectively. The contour of the teeth 13 is U-shaped. The first sleeve 71 and the second sleeve 73 have stepped surface to be engaged with the teeth 13. To cooperate with the holding function of the teeth 13 of the clip 12 to the spring 72, the first sleeve 71 is provided with a third stepped surface 83 and a third stepped surface stopper. The second sleeve 73 is provided with a fourth stepped surface 84 and a fourth stepped surface stopper. The third stepped surface 83 and the fourth third stepped surface 84 constitute the stepped surfaces to be engaged with the teeth.

Figure 4:
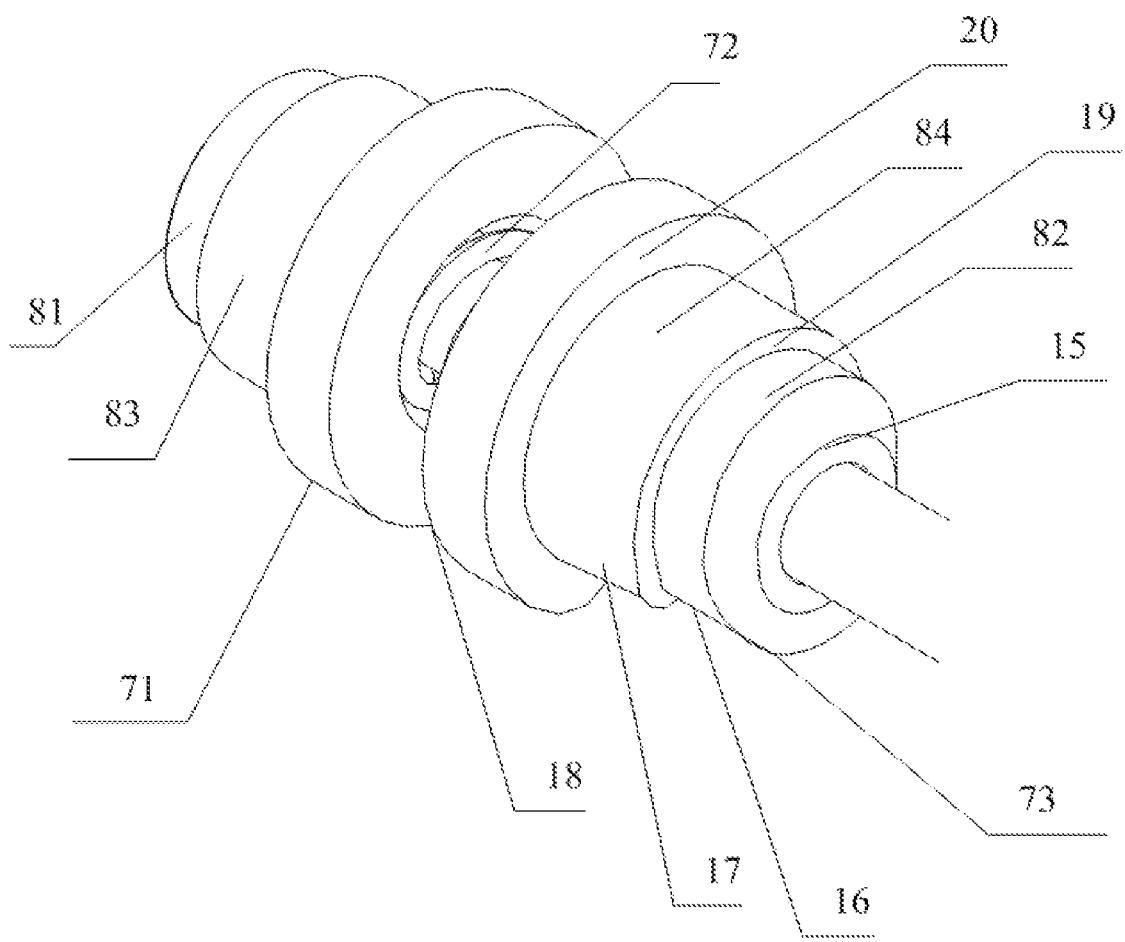
FIG. 4 is a structural diagram of the elastic locking part.
Figure 5:
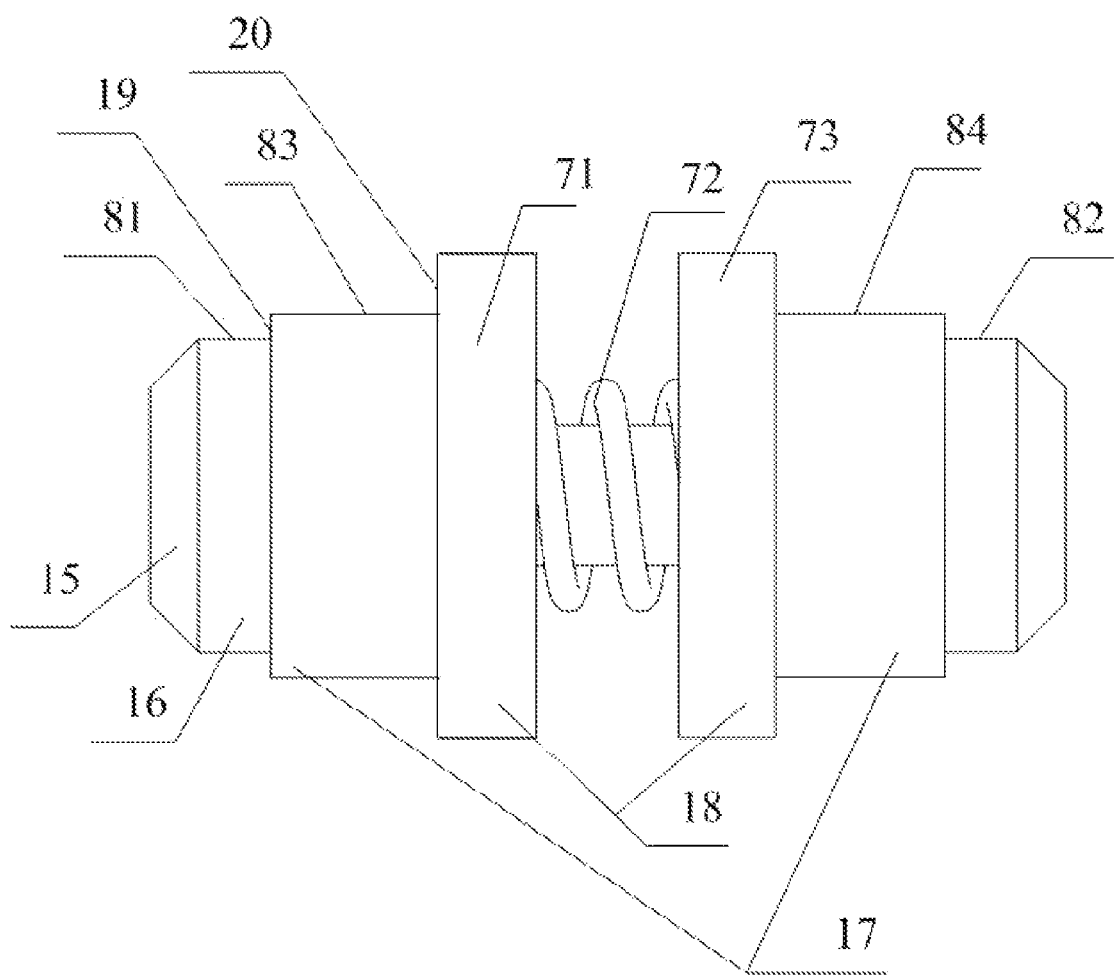
FIG. 5 is a front view of the elastic locking part.

Referring to FIG. 4 and FIG. 5, to make the skewer 2 to be embedded between the first notch 4 and the second notch 6 more stably and demount the skewer 2 more conveniently, the first sleeve 71 or (and) the second sleeve 73 include a hollow cone frustum 15, a small cylinder 16, a middle cylinder 17 and a big cylinder 18 which are stacked successively. The radius of the bottom surface of the cone frustum 15 is equal to the radius of the bottom surface of the small cylinder 16. The radius of the bottom surfaces of the small cylinder 16, the middle cylinder 17 and the big cylinder 18 increase successively. The side of the small cylinder 16 forms the first stepped surface 81 or the second stepped surface 82. The circular end faces 19 where the middle cylinder 17 and the small cylinder 16 connect form the first stepped surface stopper 19 and the second stepped surface stopper 19. The side of the middle cylinder 17 forms the third stepped surface 83 or the forth stepped surface 84. The circular end faces 20 where the big cylinder 18 and the middle cylinder 17 connect form the third stepped surface stopper 20 and the forth stepped surface stopper 20.

In one embodiment, the height of the middle cylinder 17 is equal to the thickness of the limiting piece 5. The height of the middle cylinder 17 is equal to the thickness of the rotating disk 1. In other words, the projection distance of the first stepped surface 81 to the skewer 2 in the axis direction is equal to the projection distance of the first notch 4 to the skewer 2 in the axis direction. The projection distance of the second stepped surface 82 to the skewer 2 in the axis direction is equal to the projection distance of the second notch (6) to the skewer (2) in the axis direction.

Embodiment 2

The basic structure of the barbecue cooking assembly in embodiment 2 is similar with that in embodiment 1 with below difference: the first sleeve is fixed connected with the skewer body. The surface of the skewer body is provided with a second limiting protrusion 92 which can restrict the second sleeve sliding away from the first sleeve. When the skewer is mounted on the rotating disk, the first stepped surface of the first sleeve is embedded in the first notch and the second stepped surface of the second sleeve is embedded into the second notch, the projection distance between the first sleeve and the second notch to the shaft of the skewer body is small than the projection distance between the first sleeve and the second limiting protrusion 92 to the shaft of the skewer body.

While the present patent application has been shown and described with particular references to a number of embodiments thereof, it should be noted that various other changes or modifications may be made without departing from the scope of the present patent application.

The invention claimed is:

1. A barbecue cooking assembly, comprising: a rotating disk (1) rotating around a shaft and a skewer (2) used to skewer (2) the food; the rotating disk (1) is provided with a plurality of skewer brackets (3), an edge of the rotating disk (1) is provided with a first notch (4) corresponding to each skewer bracket (3); one end of the skewer bracket (3) is fixedly connected with the rotating disk (1) and the other end of the skewer bracket (3) extends in a direction perpendicular from the rotating disk (1) to form a limit piece (5) which is parallel to the rotating disk (1), the limit piece (5) is provided with a second notch (6) which correspond to the first notch (4); the skewer comprises a skewer body and an elastic locking part (7) disposed at one end of the skewer body, the elastic locking part (7) is embedded between the first notch (4) and the second notch (6).

2. The barbecue cooking assembly in claim 1, wherein the elastic locking part (7) comprises a first sleeve (71), an elastic part (72) and a second sleeve (73) sequentially arranged on the skewer body; the two ends of the elastic part (72) connect to the first sleeve (71) and the second sleeve (73), the first sleeve (71) is provided with a first stepped surface (81) embedded in the first notch (4) and a stepped surface stopper which assist the first stepped surface (81) to be embedded in the first notch (4); the second sleeve (73) is provided with a second stepped surface (82) embedded in the second notch (6) and a stepped surface stopper which assist the second stepped surface (82) to be embedded in the second notch (6); when the first sleeve (71) is embedded in the first notch (4) and the second sleeve (73) is embedded in the second notch (6), the elastic part (72) is in a compressed status.

3. The barbecue cooking assembly in claim 2, wherein the first notch (4) and the second notch (6) have a same shape and size; the first sleeve (71) and the second sleeve (73) have a same shape and size and are setup in an opposite direction, the first notch (4) comprises an opening and an arc recess from the opening to the center of the rotating disk (1), the width of the opening is smaller than or equal to the diameter of the arc recess.

4. The barbecue cooking assembly in claim 3, wherein the width of the opening is smaller than the diameter of the arc recess.

5. The barbecue cooking assembly in claim 4, wherein a surface of the skewer body is provided with a first limiting protrusion (91) which restricts the first sleeve (71) sliding away from the second sleeve (73) and a second limiting protrusion (92) which restrict the second sleeve (73) sliding away from the first sleeve (71).

6. The barbecue cooking assembly in claim 3, wherein the elastic part (72) is a spring.

7. The barbecue cooking assembly in claim 6, further comprising a locking sleeve (10) which is fixed to a center of the rotating disk (1) and a rotating shaft passing through the locking sleeve (10); the locking sleeve (10) is a cylinder having a cavity and is coaxial with the rotating disk (1), a side of the cylinder is inserted with a braking screw (11), the rotating shaft is fixedly connected with the locking sleeve (10) by the braking screw (11).

8. The barbecue cooking assembly in claim 6, further comprising a clip (12) to hold the skewer (2), the clip (12) is provided with teeth for engaging with the first sleeve (71) and the second sleeve (73) respectively, the first sleeve (71) and the second sleeve (73) have stepped surface to be engaged with the teeth; the first sleeve (71) is provided with a third stepped surface (83) and a third stepped surface stopper, the second sleeve (73) is provided with a fourth stepped surface (84) and a fourth stepped surface stopper, the third stepped surface (83) and the fourth third stepped surface (83) constitute the stepped surfaces to be engaged with the teeth.

9. The barbecue cooking assembly in claim 8, wherein each of the teeth has a U-shaped contour.

10. The barbecue cooking assembly in claim 9, wherein the first sleeve (71) or the second sleeve (73) comprises a hollow cone frustum (15), a small cylinder (16), a middle cylinder (17) and a big cylinder (18) which are stacked successively; the radius of the bottom surface of the cone frustum (15) is equal to the radius of the bottom surface of the small cylinder (16); the radius of the bottom surfaces of the small cylinder (16), the middle cylinder (17) and the big cylinder (18) increase successively; the side of the small cylinder (16) forms the first stepped surface (81) or the second stepped surface (82); the circular end faces where the middle cylinder (17) and the small cylinder (16) connect form the first stepped surface stopper and the second stepped surface stopper; the side of the middle cylinder (17) forms the third stepped surface (83) or the forth stepped surface; the circular end faces where the big cylinder (18) and the middle cylinder (17) connect form the third stepped surface stopper and the forth stepped surface stopper.

11. The barbecue cooking assembly in claim 4, wherein the elastic part (72) is a spring.

12. The barbecue cooking assembly in claim 5, wherein the elastic part (72) is a spring.

13. A barbecue cooking assembly, comprising: a rotating disk (1) rotating around a shaft and a skewer (2) used to skewer (2) the food; the rotating disk (1) is provided with a plurality of skewer brackets (3), an edge of the rotating disk (1) is provided with a first notch (4) corresponding to each skewer bracket (3); one end of the skewer bracket (3) is fixedly connected with the rotating disk (1) and the other end of the skewer bracket (3) extends in a direction away from the rotating disk (1) to form a limit piece (5) which is parallel to the rotating disk (1), the limit piece (5) is provided with a second notch (6) which correspond to the first notch (4); the skewer comprises a skewer body and an elastic locking part (7) disposed at one end of the skewer body, the elastic locking part (7) is embedded between the first notch (4) and the second notch (6);

wherein the elastic locking part (7) comprises a first sleeve (71), an elastic part (72) and a second sleeve (73) sequentially arranged on the skewer body; the two ends of the elastic part (72) connect to the first sleeve (71) and the second sleeve (73), the first sleeve (71) is provided with a first stepped surface (81) embedded in the first notch (4) and a stepped surface stopper which assist the first stepped surface (81) to be embedded in the first notch (4); the second sleeve (73) is provided with a second stepped surface (82) embedded in the second notch (6) and a stepped surface stopper which assist the second stepped surface (82) to be embedded in the second notch (6); when the first sleeve (71) is embedded in the first notch (4) and the second sleeve (73) is embedded in the second notch (6), the elastic part (72) is in a compressed status;

wherein the first notch (4) and the second notch (6) have a same shape and size; the first sleeve (71) and the second sleeve (73) have a same shape and size and are setup in an opposite direction, the first notch (4) comprises an opening and an arc recess from the opening to the center of the rotating disk (1);

wherein the width of the opening is smaller than the diameter of the arc recess; wherein a surface of the skewer body is provided with a first limiting protrusion (91) which restricts the first sleeve (71) sliding away from the second sleeve (73) and a second limiting protrusion (92) which restrict the second sleeve (73) sliding away from the first sleeve (71).

14. The barbecue cooking assembly in claim 13, wherein the elastic part (72) is a spring.

15. The barbecue cooking assembly in claim 14, further comprising a locking sleeve (10) which is fixed to a center of the rotating disk (1) and a rotating shaft passing through the locking sleeve (10); the locking sleeve (10) is a cylinder having a cavity and is coaxial with the rotating disk (1), a side of the cylinder is inserted with a braking screw (11), the rotating shaft is fixedly connected with the locking sleeve (10) by the braking screw (11).

16. The barbecue cooking assembly in claim 14, further comprising a clip (12) to hold the skewer (2), the clip (12) is provided with teeth for engaging with the first sleeve (71) and the second sleeve (73) respectively, the first sleeve (71) and the second sleeve (73) have stepped surface to be engaged with the teeth; the first sleeve (71) is provided with a third stepped surface (83) and a third stepped surface stopper, the second sleeve (73) is provided with a fourth stepped surface (84) and a fourth stepped surface stopper, the third stepped surface (83) and the fourth third stepped surface (83) constitute the stepped surfaces to be engaged with the teeth.

17. The barbecue cooking assembly in claim 16, wherein each of the teeth has a U-shaped contour.

18. The barbecue cooking assembly in claim 17, wherein the first sleeve (71) or the second sleeve (73) comprises a hollow cone frustum (15), a small cylinder (16), a middle cylinder (17) and a big cylinder (18) which are stacked successively; the radius of the bottom surface of the cone frustum (15) is equal to the radius of the bottom surface of the small cylinder (16); the radius of the bottom surfaces of the small cylinder (16), the middle cylinder (17) and the big cylinder (18) increase successively; the side of the small cylinder (16) forms the first stepped surface (81) or the second stepped surface (82); the circular end faces where the middle cylinder (17) and the small cylinder (16) connect form the first stepped surface stopper and the second stepped surface stopper; the side of the middle cylinder (17) forms the third stepped surface (83) or the forth stepped surface; the circular end faces where the big cylinder (18) and the middle cylinder (17) connect form the third stepped surface stopper and the forth stepped surface stopper.

19. A barbecue cooking assembly, comprising: a rotating disk (1) rotating around a shaft and a skewer (2) used to skewer (2) the food; the rotating disk (1) is provided with a plurality of skewer brackets (3), an edge of the rotating disk (1) is provided with a first notch (4) corresponding to each skewer bracket (3); one end of the skewer bracket (3) is fixedly connected with the rotating disk (1) and the other end of the skewer bracket (3) extends in a direction away from the rotating disk (1) to form a limit piece (5) which is parallel to the rotating disk (1), the limit piece (5) is provided with a second notch (6) which correspond to the first notch (4); the skewer comprises a skewer body and an elastic locking part (7) disposed at one end of the skewer body, the elastic locking part (7) is embedded between the first notch (4) and the second notch (6);

wherein the elastic locking part (7) comprises a first sleeve (71), an elastic part (72) and a second sleeve (73) sequentially arranged on the skewer body; the two ends of the elastic part (72) connect to the first sleeve (71) and the second sleeve (73), the first sleeve (71) is provided with a first stepped surface (81) embedded in the first notch (4) and a stepped surface stopper which assist the first stepped surface (81) to be embedded in the first notch (4); the second sleeve (73) is provided with a second stepped surface (82) embedded in the second notch (6) and a stepped surface stopper which assist the second stepped surface (82) to be embedded in the second notch (6); when the first sleeve (71) is embedded in the first notch (4) and the second sleeve (73) is embedded in the second notch (6), the elastic part (72) is in a compressed status;

wherein the first notch (4) and the second notch (6) have a same shape and size; the first sleeve (71) and the second sleeve (73) have a same shape and size and are setup in an opposite direction, the first notch (4) comprises an opening and an arc recess from the opening to the center of the rotating disk (1);

wherein the width of the opening is smaller than the diameter of the arc recess;

wherein a surface of the skewer body is provided with a first limiting protrusion (91) which restricts the first sleeve (71) sliding away from the second sleeve (73) and a second limiting protrusion (92) which restrict the second sleeve (73) sliding away from the first sleeve (71); wherein the elastic part (72) is a spring;

wherein the barbecue cooking assembly further comprises a locking sleeve (10) which is fixed to a center of the rotating disk (1) and a rotating shaft passing through the locking sleeve (10); the locking sleeve (10) is a cylinder having a cavity and is coaxial with the rotating disk (1), a side of the cylinder is inserted with a braking screw (11), the rotating shaft is fixedly connected with the locking sleeve (10) by the braking screw (11);

wherein the barbecue cooking assembly further comprises a clip (12) to hold the skewer (2), the clip (12) is provided with teeth for engaging with the first sleeve (71) and the second sleeve (73) respectively, the first sleeve (71) and the second sleeve (73) have stepped surface to be engaged with the teeth; the first sleeve (71) is provided with a third stepped surface (83) and a third stepped surface stopper, the second sleeve (73) is provided with a fourth stepped surface (84) and a fourth stepped surface stopper, the third stepped surface

(83) and the fourth third stepped surface (83) constitute the stepped surfaces to be engaged with the teeth.

20. The barbecue cooking assembly in claim 19, wherein the first sleeve (71) or the second sleeve (73) comprises a hollow cone frustum (15), a small cylinder (16), a middle cylinder (17) and a big cylinder (18) which are stacked successively; the radius of the bottom surface of the cone frustum (15) is equal to the radius of the bottom surface of the small cylinder (16); the radius of the bottom surfaces of the small cylinder (16), the middle cylinder (17) and the big cylinder (18) increase successively; the side of the small cylinder (16) forms the first stepped surface (81) or the second stepped surface (82); the circular end faces where the middle cylinder (17) and the small cylinder (16) connect form the first stepped surface stopper and the second stepped surface stopper; the side of the middle cylinder (17) forms the third stepped surface (83) or the forth stepped surface; the circular end faces where the big cylinder (18) and the middle cylinder (17) connect form the third stepped surface stopper and the forth stepped surface stopper.

* * * * *